United States Patent [19]
O'Connor et al.

[11] 3,774,030
[45] Nov. 20, 1973

[54] DEFECT DETECTING AND INDICATING MEANS FOR NON-DESTRUCTIVE TESTING

[75] Inventors: Donald T. O'Connor, Barrington; Bruce C. Graham, Arlington Heights; David W. Prine, Maywood, all of Ill.

[73] Assignee: Magnaflux Corporation, Chicago, Ill.

[22] Filed: June 2, 1972

[21] Appl. No.: 259,342

Related U.S. Application Data

[63] Continuation of Ser. No. 27,741, April 13, 1970, abandoned.

[52] U.S. Cl. ............... 250/302, 250/363, 356/237
[51] Int. Cl. ........................................... G01n 21/16
[58] Field of Search .................. 250/71 R, 71 T; 356/237

[56] References Cited
UNITED STATES PATENTS

| | | | |
|---|---|---|---|
| 3,341,010 | 9/1967 | Switzer | 250/71 T |
| 3,510,664 | 5/1970 | Nichols | 356/237 X |
| 3,549,263 | 12/1970 | Osawa et al. | 356/237 X |

Primary Examiner—Archie R. Borchelt
Attorney—Hill, Sherman, Meroni, Gross & Simpson

[57] ABSTRACT

Defect detecting and indicating means for magnetic particle or penetrant systems in which defect indications are produced on the surface of a part. In one arrangement, radiant energy is impinged uniformly on a substantial area of the part which may be viewed while in another, the surface is scanned by a small flying spot of radiant energy, detector means being responsive to energy reflected back from the surface. In both arrangements a source of coherent radiation is used, preferably a laser, a fluorescent material is associated with the magnetic particles or the penetrant which absorbs energy at the wavelength of the radiation and emits in a different spectral range. A filter which rejects at the wavelength of the radiation may be used in front of the detector or for direct viewing. In the flying spot arrangement, signals developed may be applied to a television monitor and/or to a digital registering and pattern recognition system operative to develop an indication independent of defect position.

4 Claims, 9 Drawing Figures

PATENTED NOV 20 1973 3,774,030

INVENTORS
DONALD T. O'CONNOR
BRUCE C. GRAHAM
DAVID W. PRINE

BY Hill, Sherman and Meroni
ATTORNEYS

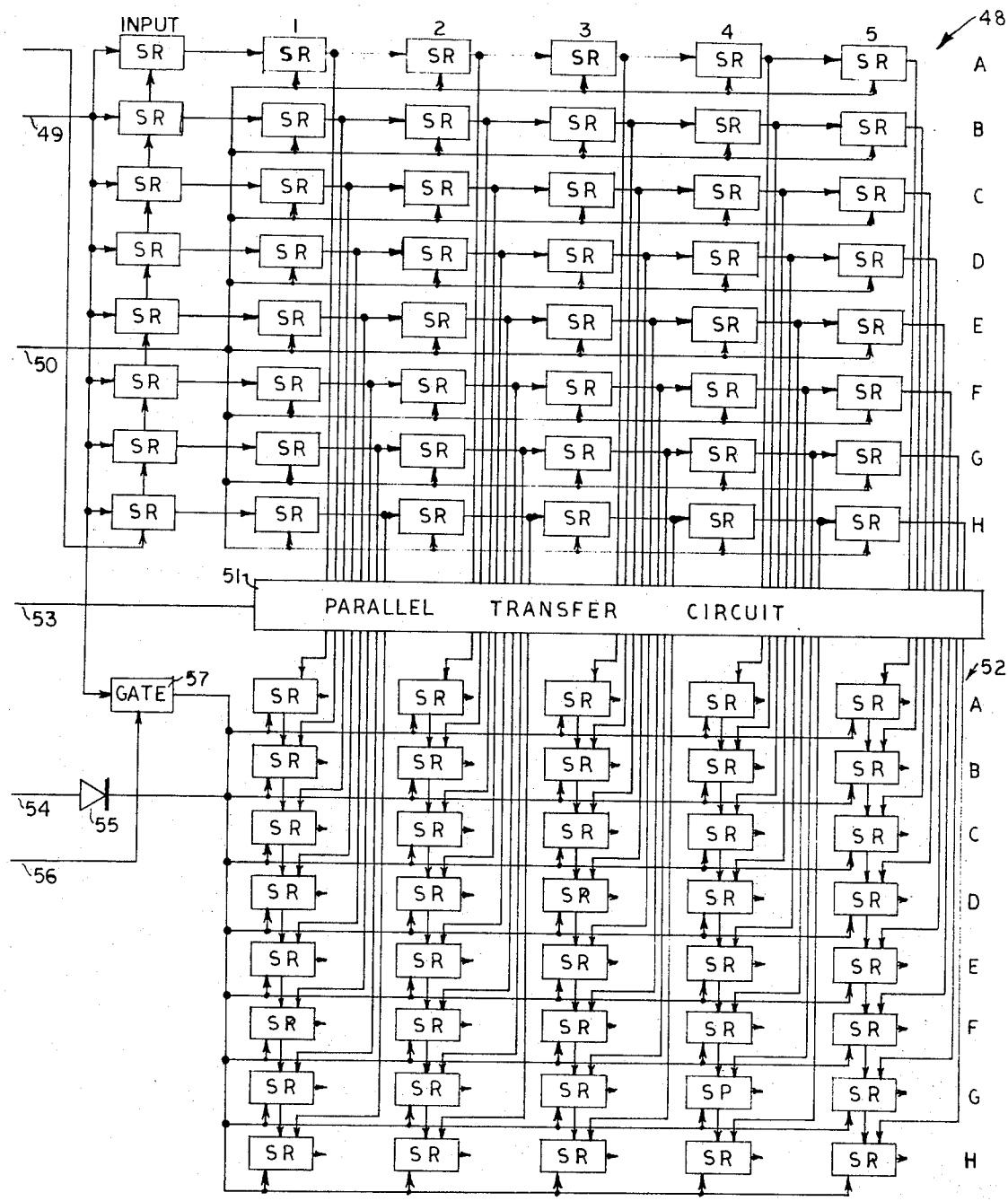

PATENTED NOV 20 1973 3,774,030

INVENTORS
DONALD T. O'CONNOR
BRUCE C. GRAHAM
DAVID W. PRINE

BY
ATTORNEYS

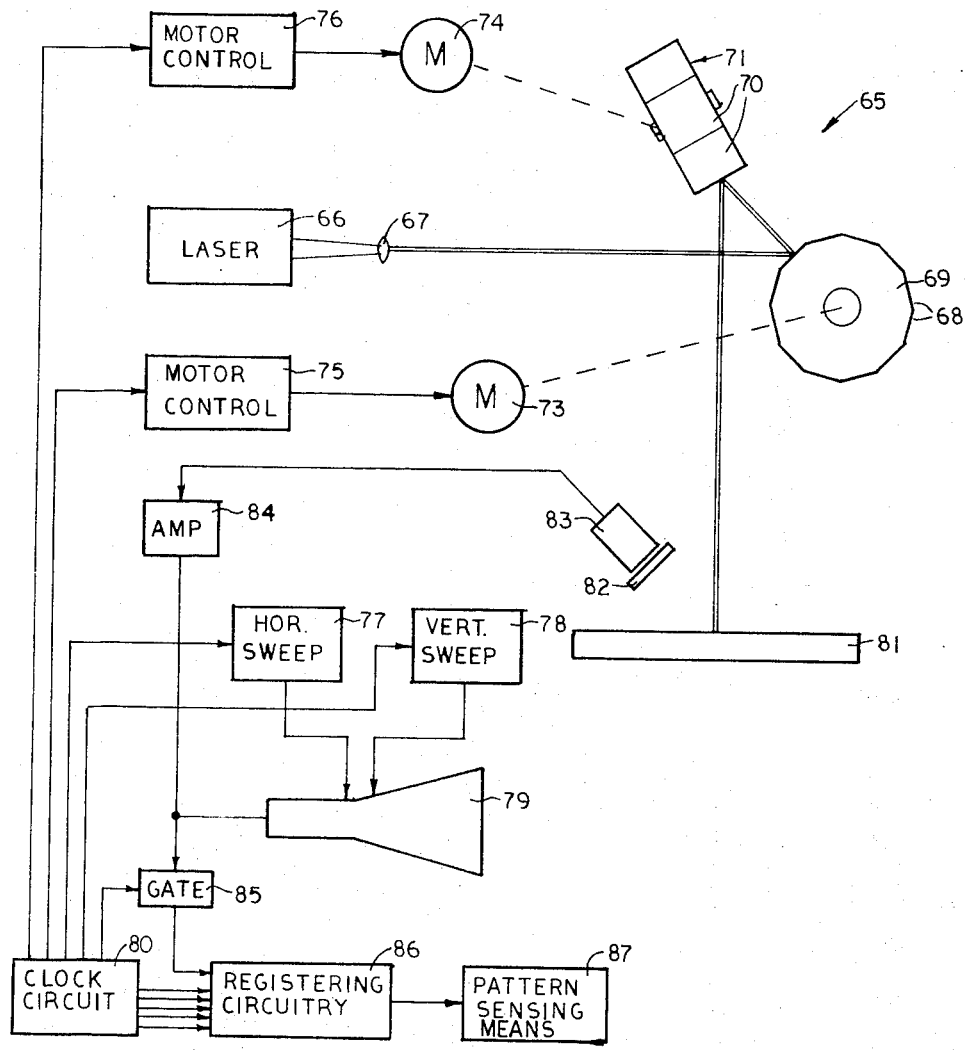
FIG 7
FIG 8
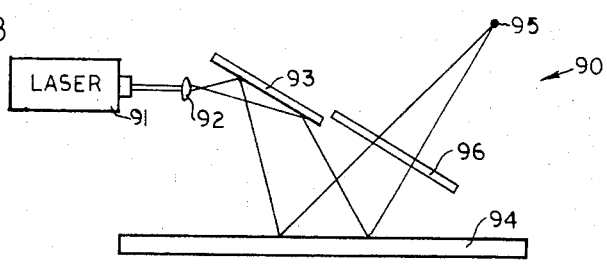

DEFECT DETECTING AND INDICATING MEANS FOR NON-DESTRUCTIVE TESTING

This application is a continuation of Ser. No. 27,741, filed April 13, 1970, and now abandoned.

This invention relates to defect detecting and indicating means and more particularly to high sensitive means for detecting defects and clearly indicating the same and which permits rapid inspection and the indication of defects independently of position on the surface of the part.

Non-destructive testing systems have been available for some time with which indications of inhomogeneities are obtained on the surface of a part with an extremely high degree of reliability. For example, penetrant systems are available in which fluid penetrates minute cracks in the surface of a part to clearly indicate the cracks, and magnetic particle inspection systems are available in which magnetic particles are concentrated over surface and sub-surface defects magnetically. With fluorescent materials, associated with the penetrants or with the magnetic particles, and with "black light" or ultraviolet illumination, the visual observation of indications is greatly facilitated.

Such systems have been highly useful and important but one difficulty has been that the defects are not always clearly indicated. Another difficulty has been that a certain amount of time has been required for visual inspection of parts and with inspection of a series of parts, fatigue of the inspector may result in the passing of unsatisfactory parts or the rejection of satisfactory parts.

Automatic inspection systems have also been used in which, while illuminating the surface of a part, it is scanned by means incuding a photoelectric detector. Such systems have been satisfactory in some applications but have generally been limited to the detection of linear and uniformly directed defects along a linear zone of a geometrically simple test piece. They have also been limited with respect to sensitivity and with respect to operating speed.

This invention was evolved with the general object of overcoming these disadvantages of prior art systems and of providing an inspection system which has high sensitivity and resolution, which is fast in operation and which is versatile while veing very reliable.

In one preferred type of arrangement according to this invention, a surface of a part is scanned by a small spot of radiant energy impinged thereon and detecting means are arranged to respond to radiation back from the surface of the part to detect indications of inhomogeneities of the part, the indication having radiation absorptive and reflective characteristics substantially different from surrounding areas of the surface. By impinging radiant energy on the surface, it is possible to obtain a high concentration of the energy and a correspondingly high sensitivity and discrimination against noise.

Additional features of the invention relate to the formation of the indications with a material having spectral characteristics so related to the spectral characteristics of the surrounding surface areas of the part and those of the impinging energy as to produce high contrast. In one preferred arrangement, a fluorescent material is associated with a penetrant or with magnetic particles to absorb energy at the wavelength of the exciting radiation and to emit energy in a different spectral range. Filter means are provided to reject the exciting radiation and to pass the emitted energy.

A specific feature is in the use of a source of coherent energy, preferably a laser, which is focused to a very small scanning spot to produce very high resolution, sensitivity and noise discrimination. In the alternative, for direct viewing, the energy may be spread uniformly over a surface area of substantial size.

Additional features relate to scanning means for rapidly moving a scanning spot over the surface of a part.

Further important features relate to detecting and indicating means. In one arrangement, signals from a photocell are applied to a television monitor having scanning means synchronized with the movements of the scanning spot. In another, signals from a photocell are applied to logic circuitry including registering circuits and pattern recognition circuits, so arranged that indications having a certain orientation, or certain orientations, are detected irrspoective of position on the surface of the part.

This invention contemplates other objects, features and advantages which will become more fully apparent from the following detailed description taken in conjunction with the accompanhing drawings which illustrate preferred embodiments and in which:

FIG. 5 is a schematic diagram of registering circuitry of the system of FIG. 1;

FIG. 7 is a schematic diagram of a modified form of system, according to the invention;

FIG. 8 is a schematic diagram of a system designed for direct viewing of defects.

Figure 1:
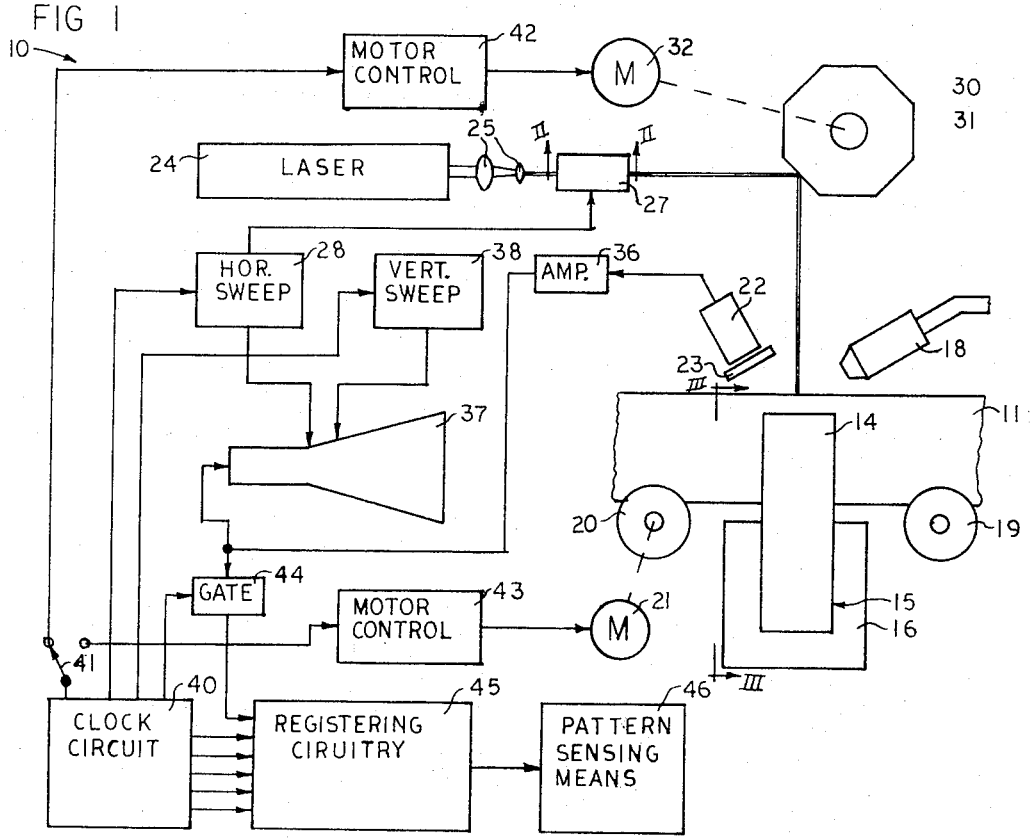
FIG. 1 is a schematic diagram of a non-destructive testing system incorporating flying spot scanning means, according to the principles of this invention.

Reference numeral 10 generally designates a non-destructive testing system incorporating flying spot scanning means and constructed in accordance with the principles of this invention. The system is shown in use in testing a pipe 11 having a weld seam 12, it being understood that the system can be used to test parts having all types of configurations.

As shown, the pipe 11 is passed between pole pieces 13 and 14 formed by legs of a U-shaped yoke 15 of magnetic material, a coil 16 on the yoke 15 being connected to a DC source 17. While magnetizing the pipe 11, a fluid containing a suspension of magnetic particles is applied on the surface of the pipe 11 and over the seam 12, as by mans of a nozzle, 18. The pipe is supported for axial movement by rollers 19 and 20 and the roller 20 may be driven by a motor 21, as diagrammatically illustrated.

Surface or sub-surface cracks or other inhomogeneities in the weld 12 or in the pipe 11 produce localized magnetic fields at the surface to attract and concentrate the magnetic particles in the region thereof, and to produce indications. In accordance with this invention, the surface of the pipe 11, including the weld 12, is scanned by a flying spot of radiant energy, preferably in the light spectrum, and detecting means, preferably in the form of a photoelectric cell 22, are arranged to respond to radiation back from the surface, to detect the indications. To obtain maximum sensitivity, it is desirable that the absorptive and reflective characteristics of the indications be as different as possible from those of the surrounding areas of the surface.

Preferably, a fluorescent material is associated with the magnetic particles, the material having a dye of pigment which is excited by radiation at a certain wavelength, or within a certain limited range of wavelengths, to emit energy in a different wavelength range. When such a fluorescent material is used, the photoelectric cell 22 may have a spectral response characteristic such as to be responsive to the energy emitted by the material while rejecting the exciting radiation. A filter 23 may be provided between the cell 22 and the surface of the pipe 11 for increasing rejection of the exciting radiation while passing the emitted radiation. The cell 22 may be a photoelectric multiplier tube, where high sensitivity is required, or may be a simpler or less expensive type of device where the sensitivity requirements are not as stringent.

In accordance with an important feature of the invention, the scanning spot is produced from a source of coherent radiation, preferably a laser 24. With coherent radiation, a very small scanning spot can be produced and since the radiation is at a single wavelength it is possible to obtain extremely high contrast especially with a fluorescent material and a filter having related characteristics. By way of example, the laser 24 may be a helium cadmium laser which may produce either violet light having a wavelength of 4416 Angstroms or ultraviolet light having a wavelength of 3250 Angstroms. Preferably, the coherent violet light is produced and a fluorescent material is used having related characteristics, as hereinafter described.

A beam from the laser 24 is focused by a lens 25 and 26 into a narrow beam which is passed through an ultrasonic deflector device 27. Device 27 is supplied with a saw-tooth sweep signal from a horizontal sweep circuit 28 which produces periodic deflection of the beam in one direction, which is in a plane transverse to the plane of the paper in the arrangement as illustrated diagrammatically.

The beam so deflected is impinged on another deflecting means which, as illustrated, comprises eight reflecting surface 30 on the octagonal periphery of a drum 31 which may be driven by a motor 32.

The beam reflected from the surfaces 30 is impinged as a very small scanning spot on the surface of the pipe 11, the spot being deflected in a transverse direction through the operation of the ultrasonic beam deflector 27 and being deflected in a longitudinal direction through rotation of the drum 31. It is noted that with axial movement of the pipe 11, obtained by drive from the motor 21, the deflecting drum 31 is not necessarily required. The drum 31 can be used only when it is desired to test the pipe 11 or another part in a stationary position, or it can be used, if desired, in combination with axial movement of the pipe 11.

Figure 2:
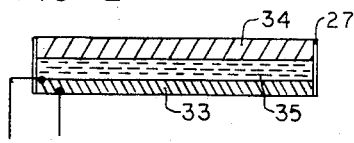
FIG. 2 is a sectional view, on an enlarged scale taken substantially along line II—II of FIG. 1 and showing an ultrasonic deflecting device.

FIG. 2 shows schematically the construction of the ultrasonic deflector 27. An ultrasonic transducer plate 33 has a surface in spaced parallel facing relation to a surface of a back plate 34 with water or another suitable liquid 35 between the facing surfaces, the light beam being passed through the liquid 35. By controlling energization of the transducer 13, the pressure and hence density of the liquid may be controlled in the portion thereof through which the light beam extends, to cause deflection of the beam in accordance with the electrical energization.

Figure 4:
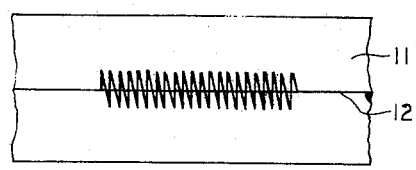
FIG. 4 is a view showing diagrammatically the movement of a scanning spot over the surface of a part.
Figure 3:
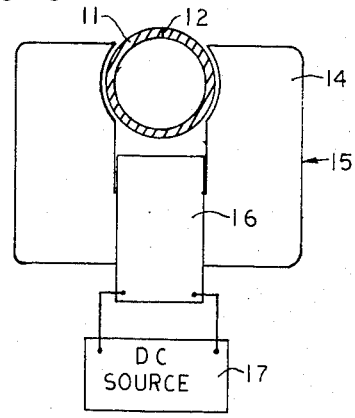
FIG. 3 is a sectional view, taken substantially along line III—III of FIG. 1, and showing a magnetizing yoke.

It is noted that FIG. 4 shows diagrammatically the movement of the scanning spot relative to the pipe 11, the movements transverse to the seam 12 being produced from the operation of the ultrasonic deflection device 27 and the longitudinal movement being produced by movement of the pipe or by rotation of the drum 31. Preferably, as shown, the deflection by the device 27 is at a much higher speed than the deflection in the longitudinal direction and it is noted that the transverse scan lines may be much closer together than is shown in the diagrammatic illustration.

It will be understood that when the scanning spot traverses an indication, energy is transmitted to the photocell 22, to produce an electrical signal. Signals so produced are amplified by an amplifier 36 and are applied to the control grid or cathode of a television picture tube 37. Horizontal deflection of the cathode ray beam of the picture tube 37 is controlled from a horizontal sweep circuit 28 while a vertical sweep circuit 38 controls the vertical deflection. The horizontal and vertical sweep circuits 28 and 38 are controlled from a clock circuit 40 which is connected through a selector switch 41 either to a control circuit 42 for the motor 32 or a control circuit 43 for the motor 21. The horizontal sweep of the picture tube 37 is thus synchronized with the operation of the deflection device 27 while the vertical sweep is snychronized with the rotation of the drum 31 or with the longitudinal movement of the pipe 11.

The output of the amplifier 36 is also applied through a gate circuit 44, controlled from the clock 40, to registering circuitry 45, coupled to pattern recognition means 46, as diagrammatically shown in FIG. 1. Such circuits operate to detect indications having a certain orientation, or certain orientations, on the surface of the pipe 11, or other part being inspected, regardless of the position on the surface.

FIG. 5 is a schematic diagram of a form of registering circuitry usable in the system. The particular form illustrated does not, by itself, form a part of the invention and it will be understood that other forms may be used in combination with the flying spot scanning system, in accordance with the principles of this invention.

As shown in FIG. 5, a first matrix or grid 48 is provided comprising forty eight shift register units arranged in eight rows, designated by refrence characters A-H and in six columns, the first being designated as the "INPUT" column and the other five being designated by reference numerals 1-5. During each tracing movement of the scanning spot in one transverse direction, the gate 44 is opened by a signal from the clock 40 to apply indication signals from the amplifier 36 to the H-INPUT shift register stage and clock signals are simultaneously applied to all of the input shift register stages to progressively shift signals through the input shift register stages so that any signal applied at the start of the transverse trace will be stored in the A-INPUT stage at the end of the trace. The clock signals are applied to the input stages from the clock 40 through a line 49. During the retrace movement, a clock pulse is applied through line 50 to all of the shift register stages of columns 1–5 so that at the end of five successive trace and retrace movements, signals will be stored in the stages of columns 1–5 corresponding to the pattern of indications, on a certain surface portion of the part. With subsequent trace and retrace movements, the portion of the part will respect of which information is stored will shift longitudinally.

All of the stages of columns 1–5 of grid 48 are connected through a parallel transfer circuit 51 to a second shift register matrix or grid 52. During each retrace movement, following the application of a clock signal on the line 50, a gate signal is applied through a line 53 to the parallel transfer circuit 51 while a clock signal is applied through a line 54 and a diode 55 to all stages of the second grid 52, to shift any signal stored in any stage of columns 1–5 of the first grid to a corresponding stage of the second grid 52. During each trace operation, a gate signal is applied through line 56 to a gate 57 to cause the clock signals from line 49 to be applied to all stages of the second grid 52. The second grid 52 is so arranged that signals are shifted progressively from one stage to another in each column, from the A stage to the B stage, from the B stage to the C stage, and so on.

Figure 6:
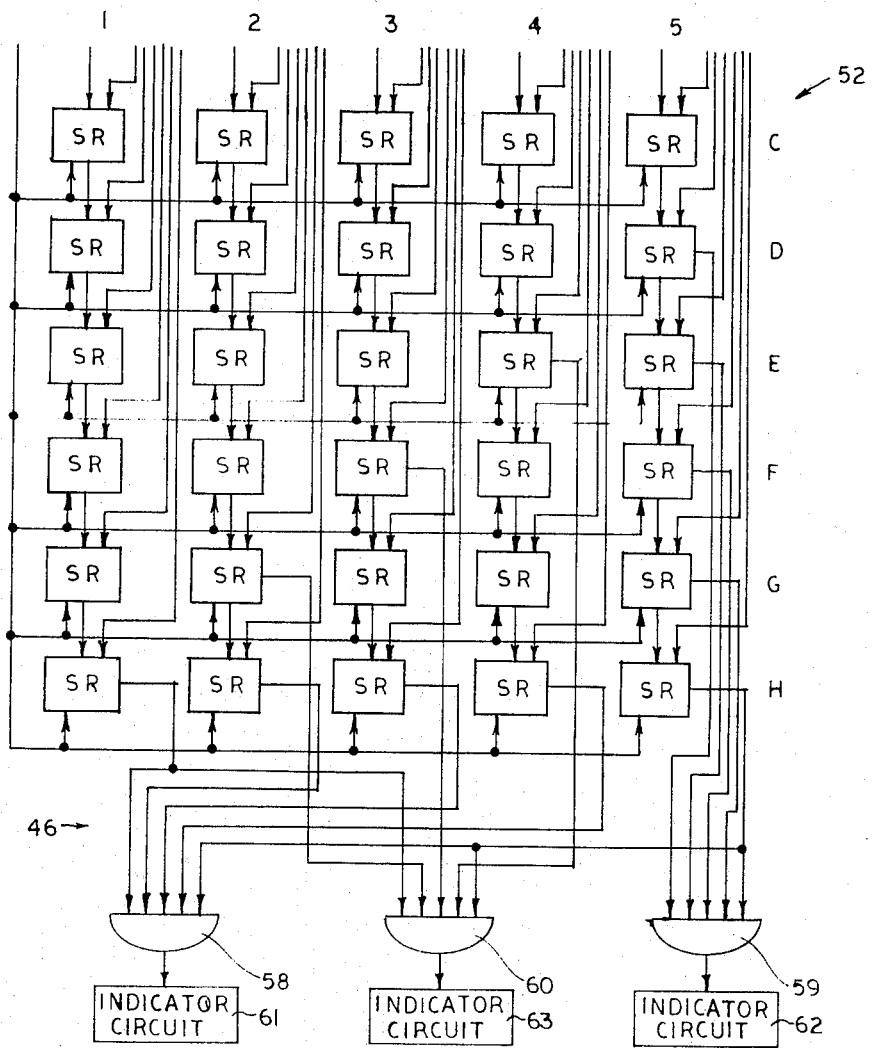
FIG. 6 is a schematic diagram of pattern recognition circuitry of the system of FIG. 1.

FIG. 6 shows the second shift register grid 52 and the connection thereof to the pattern recognition means 46 which, as illustrated, comprises three AND gates 58, 59 and 60 having outputs connected to three indicator circuits 61, 62 and 63. The illustrated gate 58 has five inputs connected to the outputs of the 8 shift register stages. The gate 59 has five inputs connected to the D, E, F, G and H stages of column 5. The gate 60 has five inputs connected to the H–1, the G–2, the F–3 stage, the E–4 stage and the D–5 stage. With the illustrated arrangement, the indicator 61 will be energized in response to any longitudinally extending indication having a certain length, regardless of its relative transverse position, at some time during the operation. The indicator 62 will be energized, at some time during the operation, in response to any transversely extending indication of a certain length, regardless of its relative position. The indicator 63 will be energized, at some point during the operation, in response to any indication extending at a certain angle and having a certain length, again without regard to its location. It will be understood that the connections shown to the gates 58, 59 and 60 are arbitrary and that they may be changed according to the type of indication which it is desired to detect. A fewer or greater number of gates and indicators may be provided, if desired. Also, the numbers of shift register units in the rows and columns can be increased, or decreased, in accordance with the requirements in a particular testing operation.

FIG. 7 illustrates a modified system 65 in which deflections in both directions are accomplished by means of rotating drums. In this system, the beam from a laser 66 is passed through a lens 67 and is impinged on reflectng surfaces 68 at the periphery of a rotating drum 69. Twelve reflecting surfaces 68 are shown, but it will be understood that the number may be increased in order to reduce the rotational speed required to obtain a given number of sweep movements per unit time. The beam reflected from the surfaces 68 is impinged on surfaces 70 of a second rotating drum 71 which may be an eight-sided drum similar to the drum 31. The drums 69 and 71 are driven by motors 73 and 74 controlled from motor control circuits 75 and 76. Circuits 75 and 76 and horizontal and vertical deflection circuits 77 and 78, for a picture tube 79, are controlled from a clock 80 for synchronization of the scanning movement of the cathode ray beam of the picture tube 79 with the scanning movements of the light beam.

The beam is impinged at a spot on a part 81 being tested and energy reflected back from the surface of the part 81 is passed through a filter 82 to a photocell 83 connected through an amplifier 84 to the intensity control circuit of the picture tube 79. The output of the amplifier 84 may also be applied through a gate 85, controlled from the clock 80, to a registering circuit 86 connected to a pattern recognition circuit 87. Circuits 86 and 87 may be the same as circuits 45 and 46 described above and it will be understood that the overall operation of the system is similar to that of the system 10 of FIG. 1.

Referring to FIG. 8, reference numeral 90 generally designates another form of non-destructive testing system according to the invention in which no flying spot scanning means are employed. In this arrangement, light from a laser 91 is spread and directed by means of a lens 92 and a mirror 93 to uniformly illuminate a surface area of substantial size of a part 94 which may be inspected from a viewing point 95. A filter 96 is disposed between the illuminated surface area of the part 94 and the viewing point 95. If desired, goggles may be worn by the inspector incorporating a suitable filter material, in place or in addition to using the filter 96.

The part 94 may be magnetized and a fluid containing magnetic particles may be applied over the surface of the part or a penetrant may be applied over the surface of the part, a fluorescent material or dye being associated with the magnetic particles or the penetrant. The dye has an absorption peak at a wavelength in the neighborhood of the wavelength of the laser light and has an emission peak at a substantially lower wavelength. The material of the filter 96 (or of the goggles) is arranged to reject the light from the laser 91 while passing light emitted by the fluorescent dye.

The combination of a laser, a fluorescent dye and a filter having related characteristics, as used in the system of FIG. 8, as well as in the systems of FIGS. 1 and 7, achieves very important advantages. Such advantages will be best understood by first considering prior art magnetic particle and penetrant systems.

Prior systems have been characterized by inefficiencies in the utilization of light in exciting a fluorescent dye or pigment. Such inefficiencies arise from three basic limitations. The first limitation is the broad spectral distribution of most commonly available light sources. The second limitation arises from the fact that the spectral separation in wavelength between the absorption and fluorescent emission peaks for any pigment or dye is relatively constant and independent of position in the spectrum. Thus if a material absorbs strongly in the near ultraviolet, it will fluoresce strongly in the blue whereas, if a material absrobs in the blue, it will emit yellow light. The third limitation arises from the wide angle over which conventional sources emit light.

To achieve good suppression of source light while observing small fluorescent indications, the first limitation dictates the use of an ultraviolet light source. This brings the second limitation into play. To achieve good visibility, the dye or pigment should fluoresce in the yellow or yellow-green portion of the spectrum. Not only is this desirable because of the spectral response of the human eye, but is also necessary because the broad emission spectrum of the source leaves considerable blue light after filtering which would interfere strongly with observants of any blue indications. To achieve fluorescence at the desired wavelength, either there is inefficient operation of a yellow emitting pigment or dye due to the far removal from the dye absorption peak or cascading must be employed. In cascading, two dyes are used, one of which absrobs strongly in the ultraviolet and emits blue and the second of which absorbs blue and emits yellow. Since the fluorescent porcess is somewhat inefficient, the improvement is not accomplished wihtout throwing away most of the source illumination.

The third limiation results in the concentration of very little of the light output from the source at the inspection area and also results in low intensity per unit area.

The laser has very important properties which when combined with appropriate dyes and filters, very neatly circumvent the three basic limitations mentioned above. The light emitted by a laser is very monochromatic. Its linewidth is many orders of magnitude narrower than that obtainable with either a low pressure noble gas or mercury arc discharge. Because of the extremely narrow linewidth, efficient dielectric film rejection filters can be used to keep the intense laser light out of a photoelectric detector or out of the eye of the inspector. Rejection filters are available with rejection bandwidths of about 200 Angstroms, with a transmission inside the rejection band of less than one-tenth percent while outside the rejection band, the transmission is on the order of from 80 to 90 percent. Two or three of such filters may be cascaded to provide attenuation of unwanted radiation by factors of one million or one billion.

With such efficient narrow band filtering, it is not necessary to cascade two dyes and it is possible to achieve a very high degree of efficiency in the excitation of the fluorescent material while keeping the laser light out of the detector or the eyes.

One example of a suitable combination of a laser and a fluorescent material, according to the invention, is a helium-cadmium laser combined with an amino naphthalimide (4-N butylamino, 1, 8-naphthal, N-butylimide) having a structural formula:

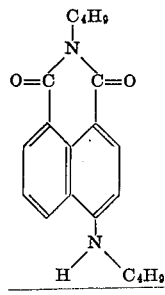

This amino naphthalimide is soluble in most organic solvents, but not in water. In very polar organic solvents, its absorption peak is at 440 millimicrons, although in hydrocarbons its peak can be as low as 400. Its fluorescent color is green to green-yellow, depending upon the solvent.

The helium-cadmium laser has an output at 441.6 millimicron and is ideally suited for use with this dye.

Figure 9:
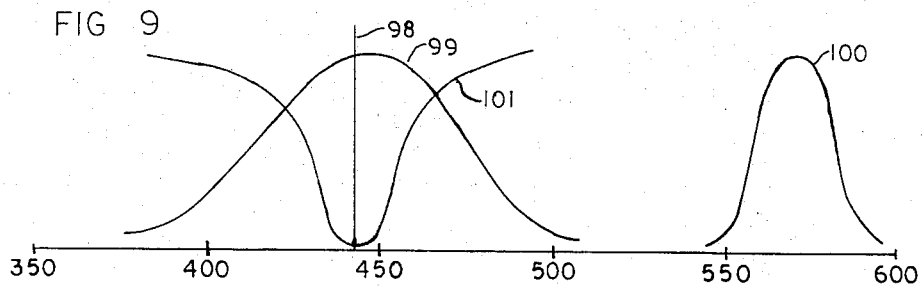
FIG. 9 shows graphically the relative characteristics of a light source, a dye and a filter usable in the systems of FIGS. 1–8.

FIG. 9 shows the approximate relative characteristics of the helium cadmium laser, the amino naphthalimide dye and a filter. The emission of the laser is indicated by lime 98 at 441.6 millimicrons. The absorption of the dye is indicated by curve 99 while the emission of the dye is indicated by curve 100. The pass characteristics of the filter is indicated by reference numeral 101. It will be noted that the dye is efficiently excited at the peak of its absroption characteristics to emit at a wavelength within the visible range and well outside the rejection range of the filter while the laser light is substantially completely filtered out.

Another example of a suitable combination of a laser and a fluorescent material, according to the invention, is an argon-ion laser combined with a uranine dye having a structural formula:

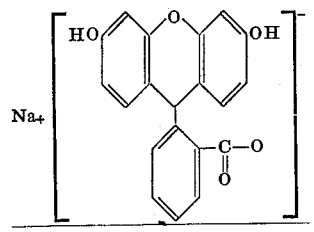

Uranine is soluble in water and alcohols and has an absorption peak at 490–500 millimicrons, close to the output of the argon-ion laser, 488 millimicrons. It fluoresces a bright yellow.

It will be understood that other combinations may be used and it is not necessary that the peak absorption of the dye be always exactly matched to the laser, depending upon the efficiency required for a given practical application.

It will be understood that other modifications and variations may be effected without departing from the spirit and scope of the novel concepts of this invention.

We claim:

1. In a system for non-destructive testing of a part, testing means for producing on a surface of the part indications of inhomogeneities of the part, said indications being in the form of concentrations of a fluorescent material in patterns corresponding to the form of the inhomogeneities of the parts, said fluorescent material having a peak absorption characteristic at a first wavelength and having a peak emission characteristic at a second wavelength substantially longer than said first wavelength, laser and scanning means for producing a narrow concentrated beam of parallel light rays impinged on a small spot on said surface of the part and for effecting movement of said spot over an area of said surface of the part in a certain scanning pattern, the size of said spot being substantially independent of variations in distance between said laser and scanning means and the part, said coherent light having a wavelength substantially equally to said first wavelength to cause said fluorescent material to produce high energy emissions at said second wavelength when impinged by said narrow concentrated beam, photoelectric detector means for responding to said high energy emissions at said second wavelength and to produce electrical pulse signals in response to scanning movements of said spot across said indications and imaging means coupled to said scanning means and responsive to said electrical signals to produce images having patterns corresponding to the patterns of inhomogeneities in the part.

2. In a system as defined in claim 1, said imaging means being operative to respond to a series of signals corresponding to an indication lying in a straight line in one direction on said surface of the part.

3. In a system as defined in claim 2, said imaging means comprising a television picture tube, deflection circuit means associated with said tube, means for synchronizing the operation of said deflection circuit means and the scanning movement of said spot, and means for applying signals from said detector means to said picture tube.

4. In a system as defined in claim 2, said imaging means comprising digital processing means including storage means for storing a series of signals from an indication lying in a straight line in one direction on said surface of the part.

* * * * *